Oct. 11, 1966 O. FREUDENSCHUSS 3,278,251

ARRANGEMENT FOR THE SYNCHRONOUS RECORDING OF IMAGE AND SOUND

Filed April 17, 1964

3 Sheets-Sheet 1

Inventor:
Otto Freudenschuss
By Ernest G. Montague
Attorney

Oct. 11, 1966 O. FREUDENSCHUSS 3,278,251

ARRANGEMENT FOR THE SYNCHRONOUS RECORDING OF IMAGE AND SOUND

Filed April 17, 1964

3 Sheets-Sheet 2

Inventor:
Otto Freudenschuss
By Ernest G. Montague
Attorney

Oct. 11, 1966 O. FREUDENSCHUSS 3,278,251

ARRANGEMENT FOR THE SYNCHRONOUS RECORDING OF IMAGE AND SOUND

Filed April 17, 1964

3 Sheets-Sheet 3

Inventor:
Otto Freudenschuss
By Ernest G. Montague
Attorney

United States Patent Office 3,278,251
Patented Oct. 11, 1966

3,278,251
ARRANGEMENT FOR THE SYNCHRONOUS RECORDING OF IMAGE AND SOUND

Otto Freudenschuss, Vienna, Austria, assignor to Karl Vockenhuber, Potzleinsdorferstrasse, Vienna, and Raimund Hauser Weyrgrasse, Vienna, Austria
Filed Apr. 17, 1964, Ser. No. 360,573
Claims priority, application Austria, Apr. 19, 1963, A 3,179/63
28 Claims. (Cl. 352—15)

The invention relates to an arrangement for the synchronous recording of image and sound, by use of a film camera and a tape recorder, wherein the frame frequency of the camera is regulated according to the film or tape lengths run down, by a synchronous regulating device and the tape recorder is controlled by means of the camera, so that the camera and the tape recorder can be simultaneously started as well as arrested.

It is an object of the invention to simplify the handling of the arrangements of the above mentioned kind and to eliminate errors in handling, as far as possible.

In order to solve this problem it is suggested, according to the invention, to provide switches on the camera as well as on the tape recorder, the switches being adapted to preselect the synchronous image and sound recording and to effect—when being in the position "sound film recording"—all switching operations, which enable the start and stop by means of the camera and the synchronous control of the camera motor. The preselection switch, arranged on the camera, opens a switch provided in the circuit of the camera motor, when set on sound film recording, and a circuit, overbridging the lastmentioned switch contains a further switch, which is arranged on the tape recorder and which is closed by a preselection switch of the tape recorder, when the same is set to sound film recording.

Figure 1:
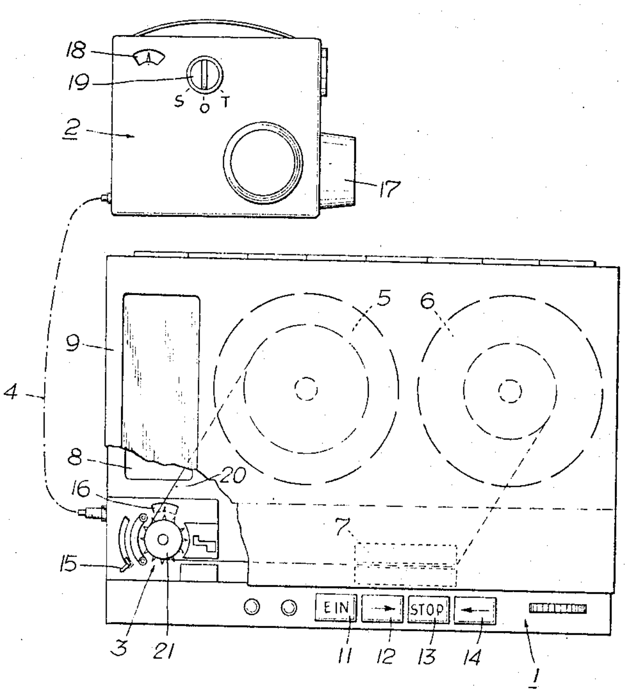
Figure 2:
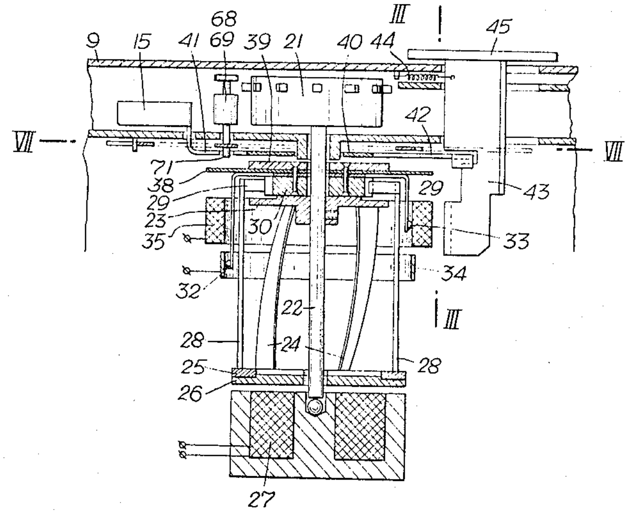
Figure 3:
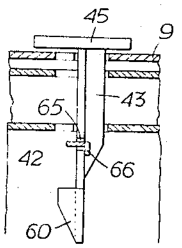
Figures 4, 5, 6, 7, 8:
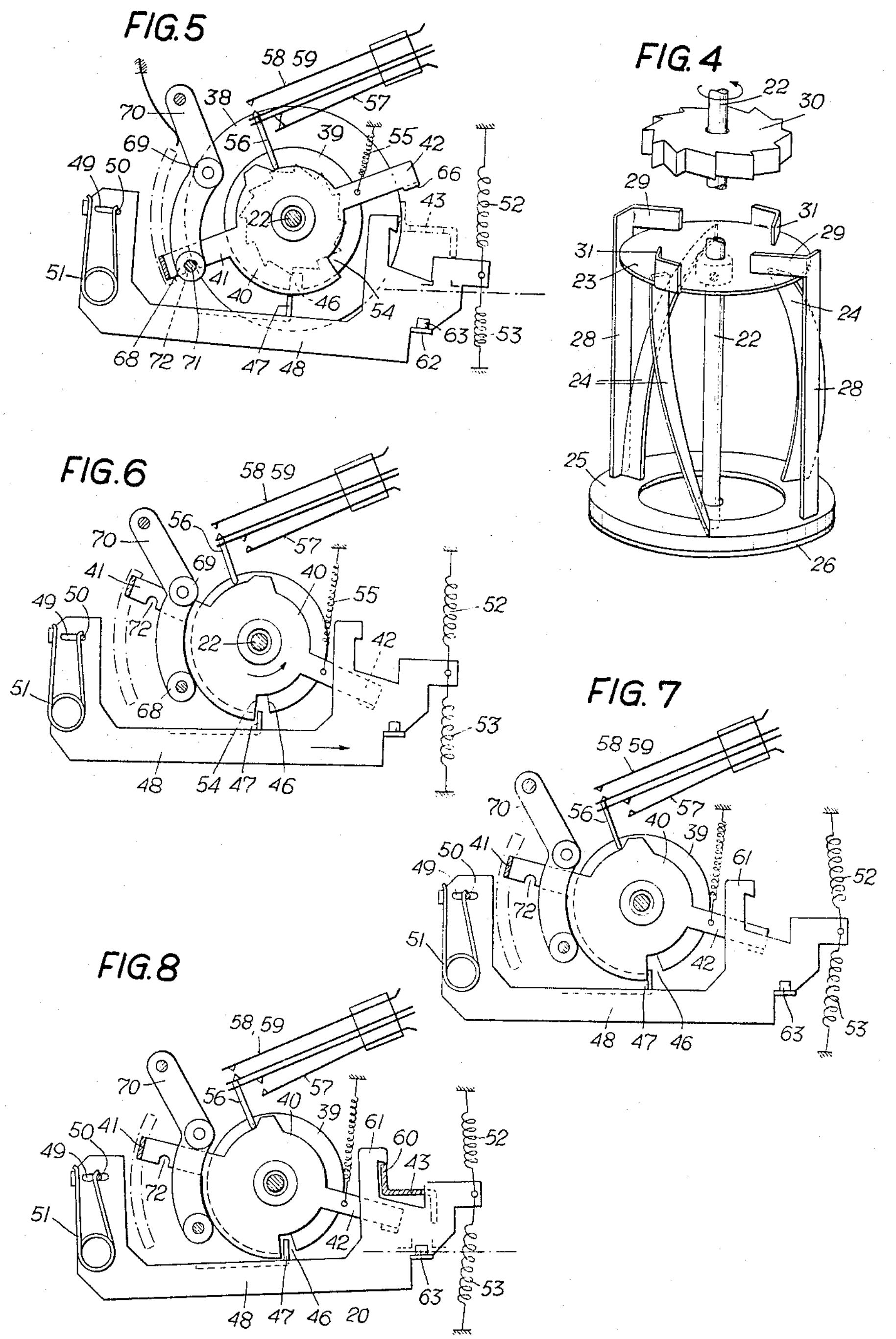
Figures 9, 10, 11, 12:
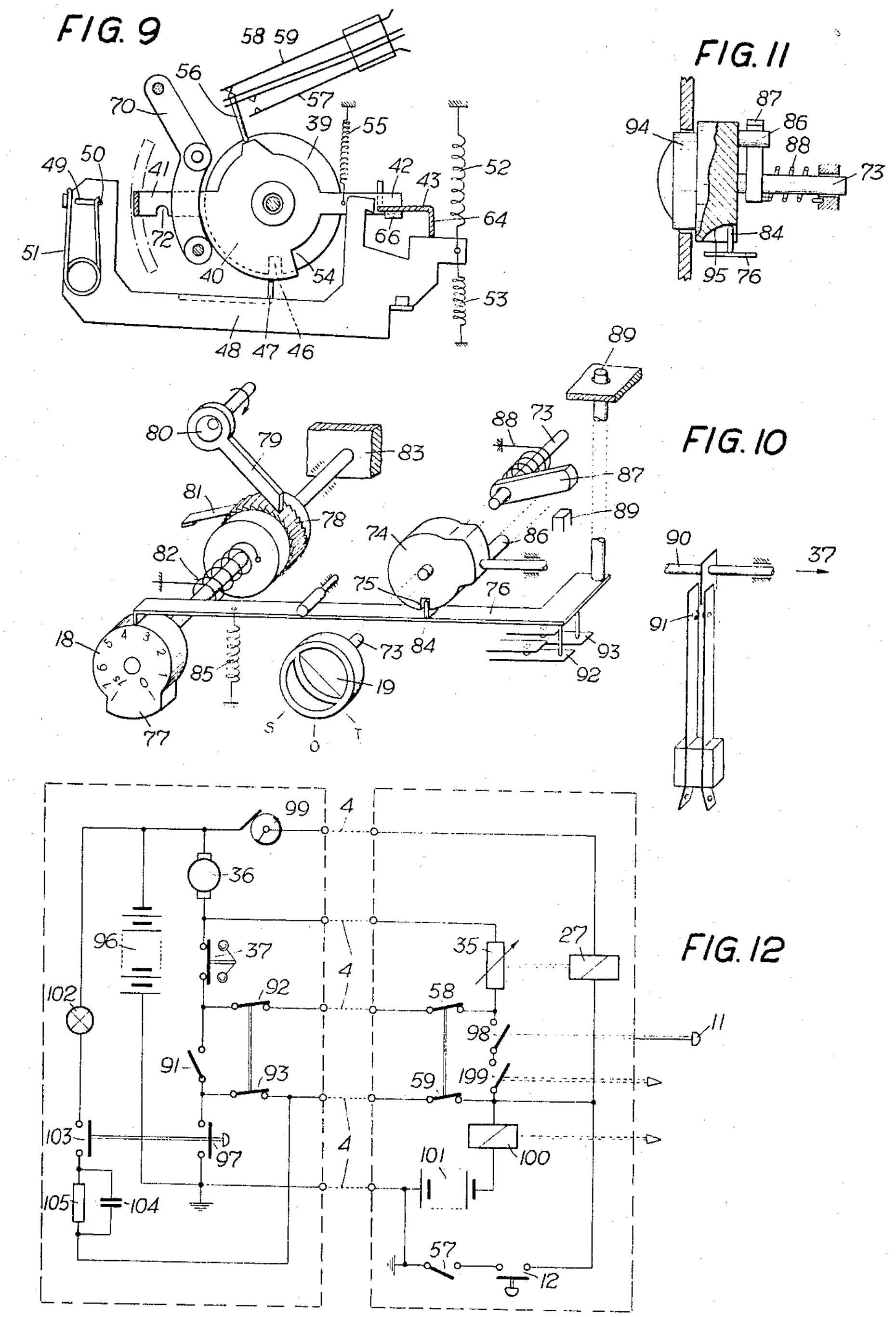

With these and other objects in view, which will become apparent in the following detailed description, the present invention will be clearly understood in connection with the accompanying drawings in which:

FIG. 1 shows a representation of the entire arrangement, FIG. 2 shows a detail of the tape recorder in a magnified scale, FIG. 3 is a sectional view along the plane III—III in FIG. 2, FIG. 4 shows diagrammatically one element of the synchronous regulator as shown in FIG. 2. FIGS. 5 to 9 represent a sectional view of the preselection switch, arranged on the tape recorder, in different settings, along the plane VII—VII in FIG. 2. FIG. 10 shows diagrammatically the preselection switch arranged on the camera. FIG. 11 represents a variant of the detail shown in FIG. 10. FIG. 12 shows a circuit diagram of the new arrangement. FIG. 1 represents a new arrangement for the sound film recording, consisting of a tape recorder 1 and a camera 2 for substandard film. The synchronous regulating device 3 is constructively connected to the tape recorder 1. A multiwire cable connects the camera 2 to the tape recorder 1. The tape recorder 1 is constructed in the usual manner and has a supply reel 5, a take-up reel 6 as well as the sound-head component (recording, reproduction and erase head) which is covered by a cap 7, and a capstan, adapted for the driving of the tape and being also covered by the said cap. A loudspeaker is provided beside the supply reel 5. The spools 5 and 6, the loudspeaker 8, the sound-head component and the synchronous regulating device are enclosed by a hinged lid 9, which is connected to the tape recorder 1 by hinge-joints. Multiple operating elements are provided outside of the lid on the tape recorder. The key 11 is adapted to switch on the amplifier as well as the driving motor. When operating the switch key 12, the capstan—nonrepresented—is put into engagement with the tape. The "stop" key is indicated at 13, and the rewind key at 14. The other operating elements on the tape are adapted for the control and switching over the amplifier and the oscillator. The preselection switch of the tape recorder, adapted for the sound film recording is connected to the synchronous regulating device 3. The operating handle of this preselection switch is indicated in the drawing at 15, the reference number 16 indicates a scale on the synchronous regulating device, the scale indicating the synchronous deviation.

The camera has an objective 17, a counting device 18, as well as a preselection switch 19. In the position as shown, this switch is in its neutral position in which the release of the camera is locked. In the position indicated at S the camera is prepared for the silent film recording, in the position indicated at T, for sound film recording.

In order to achieve a well-defined coordination of film and tape, and to eliminate faults due to slip, elongation of the tape etc., a perforated tape is used in the tape recorder. The perforation is so selected, that each picture of the film corresponds to a sprocket hole on the tape. The tape 20 winds around a sprocket 21, arranged before the said-head element, and thus drives this sprocket in a counterclockwise direction. A disk 23 is fastened on the shaft 22 of the sprocket 21, the disk carrying three blades 24, which are in the shape of a helicoid and which are staggered 120° (see also FIG. 4). The free ends of these blades are connected by a ring 25, on which a soft iron plate 26 is fastened. The plate 26 is arranged opposite a cup-shaped electromagnet 27 which is fastened in the device in a non-represented manner and which contains the pivot bearing for the shaft 22. If the electromagnet 27 is energized, the soft iron plate 26 is pulled down. As a result of the suspension of the soft iron plate on the helicoid-shaped blades, an axial displacement of the plate 26 causes the latter to turn in a clockwise direction. The arrangement is designed in such a manner that the blades 24 are stretched when the magnet is energized, i.e. the blades are in a position parallel to the axis and the plate 26 is spaced from the magnet 27 by a small air space. The rotating movement of the plate 26 is transmitted to a ratchet wheel 30 by two arms 28, arranged parallel to the axis, each of them carrying a pawl 29. The ratchet wheel 30 is rotatable around the axis 22. The pawls 31 mounted on the disk 23 prevent a turning back of the ratchet wheel 30. The sprocket 21 and the ratchet wheel 30 have the same number of teeth. If an impulse is led to the electromagnet 27 for each image exposed, the ratchet wheel 30 remains stationary when the film and tape are synchronously running, with exception of an oscillating movement. The disk 23, the blades 24, the ring 25, the arms 28 and the pawls 29 and 31 are integral portions of one common part and are made of an elastical plastic. Acetate resins, known, e.g. under the trade-mark Delrin, are—amongst others—a suitable material therefor.

Two sliders 32 and 33 are connected to the ratchet wheel 30, the first one resting against a contact face 34, the other one against a resistor 35. The parts 32 to 35 form a variable resistor which is in the circuit of the camera motor 36 and overbridges the speed control device 37 of the said camera motor. The ratchet wheel is furthermore connected to a disk 38, this disk has a scale 16 which may be seen through a window of the housing and indicates the respective position of the ratchet wheel 30 and thus also the displacement of the image and the sound.

A disk 39 is finally coupled to the ratchet wheel 30. A disk 40 is arranged directly opposite the disk 39, the disk 40 being mounted on the sheet bar of the tape recorder and having two arms 41 and 42. The first arm 41 is offset and carries the operating handle 15, the second arm 42 cooperates with a key 43, slidably arranged on the lid 9 of the sound recorder and kept in the represented position by a spring 44. On the outer surface of the lid a sliding key is provided for the adjustment of the key 45.

In the following, the mode of operation of the portions 39 to 45 is explained, with reference to FIGS. 5 to 8.

The disk 39 has a recess 46, which is opposite the extension 47 of the ratchet lever 48, when the displacement of image and sound, indicated by the scale 16 is zero (FIG. 5). The resistor 35 is dismensioned in such a manner, that the synchronous regulator has the position shown in FIG. 5, when the camera is in operation with a medium state of charge of the battery of the camera motor. The ratchet lever is rotatably and longitudinally slidable mounted on a stationary pin 50, engaging a slot 49, and is held in its rest position by a spring 51. Two springs 52 and 53 try to swing the lever in such a manner, that it takes the position shown in FIG. 6. According to FIG. 5, the extension 47 is resting against a curved piece of the disk 40, the curved piece having a greater radius than the disk 39, so that the disk 39 may be easily moved. If the disk 40—representing the core part of the preselection switch of the tape recorder—is moved by the handle 15 in a clockwise direction, the recess 54 will finally be situated in front of the extension 47. When the disk 39 has the position shown in FIG. 5, the extension catches the two recesses under the action of the spring 52. As soon as the handle 15 is released, the spring 55, acting on the arm 42 will turn the disk 40 in a counterclockwise direction, such overcoming the relatively soft spring 51 of the ratchet lever and moving the latter in its right hand end position (FIG. 7). In this position, the device is ready to be switched over to sound film recording. Three curved pieces having different radii are provided on the side of the disk 40, diametrically opposite to the recess 54 and a pin 56 is resting against the curved pieces and controls the switches 57, 58 and 59. In the position shown in FIG. 5, the pin 56 is resting on the curved piece having the smallest radius, the contact of the switch 57 is closed, the contacts of the switches 58 and 59 are open. The pin 56 comes to the curved piece having a medium radius, when the device is changed to the preparatory position. Thus the contact of the switch 57, arranged in the circuit of the starting switch 12 is opened, the contacts of the switches 58 and 59 remain however open as well.

When the lid 9 of the sound recorder is closed, first the the contact of the switch 57 is closed, the contacts of the ratchet lever 48 and moves the latter in a counterclockwise direction, the spring 53 is stretched and a stamp 63 provided on a vertical lug stamps a notch into the tape 20 (FIG. 7). Then the curve 60 of the key 43 releases the ratchet lever, which is moved back by the spring 53. Finally the curve 64 of the key 43 engages the ratchet lever and moves the latter in a clockwise direction until the extension 47 is lifted off the recesses 46 and 54 of the disks 39 and 40. The spring 55 moves the disk 40 in a counterclockwise direction, and the arm 42 abuts against the key 43 and keeps the disk 40 in the position "sound film recording". The arm 42 comes into the slot 65 of the key 43 when the lid 9 is completely closed. The lug 66 of the arm 42 prevents the disk 40 to be turned. By this fact the lid 9 is locked and an unintentional opening of the same is prevented (FIG. 9).

In order to open the lid 9, the key 43 is moved to the right by means of the sliding key 45, so that the lug 66 of the arm 42, and the key 43 come out of engagement, the lid 9 is unlocked and the disk 40 of the preselection switch returns in its rest position. A further marking arrangement may be controlled by the displacement of the key 43, the marking arrangement indicating the end of the recording. It is obvious, that the marking of the tape may also be effected by imprinted or magnetically recorded marks rather than by notches stamped into the tape. If the lid 9 is closed when the preselection switch is in its rest position, the tape 20 is not marked because the ratchet lever 48 is in its left hand end position and the curve 60 of the key 43 does therefore not engage the stop pin 61 of the ratchet lever. In this case the lid is not locked.

In order to ensure a satisfactory engagement of the perforation of the tape by the sprocket 21, pressing rollers 68 and 69 are provided on a common sheet bar 70 and are pressed onto the sprocket 21 under the action of a spring. A pin 71 is provided on the sheet bar (FIGS. 2 and 5), the pin engaging a recess 72 of the arm 41 when the pressing rollers are moved away and the disk 40 is in its rest position. If the operating handle 15 is moved into the preparatory position, the recess 72 releases the pin 71, so that the pressing rollers come to rest against the sprocket.

FIG. 10 shows the preselection switch provided on the camera as well as the parts directly cooperating with the preselection switch. A cam disk 74 is mounted on the shaft 73 of the adjusting knob 19 of the preselection switch, the cam disk having a recess 75 on its periphery. When the camera is adjusted to "sound film recording" (T) the recess 75 is situated in front of an extension 84 of a two-armed lever 76. The lever 76 rests with its other arm against a cam disk 77 which carries the scale of the counting device. The cam disk 77 is driven, as known, by the camera driving means via a ratchet driving means 78, 79, 80, 81. A spring 82, axially acting on the ratchet wheel 78 is stretched by the turning of the ratchet wheel 78. When the lid 83, closing the spool room, is open, the spring 82 moves the ratchet wheel in an axial direction and the pawl 79 disengages the toothing, and the ratchet wheel is turned back in its initial position by the spring 82.

During the run of the leader and the trailer, the lever 76 rests on that curved piece of the cam 77, having a radius which is so large that the extension 84 cannot enter the recess 75. During the run of the effective portion of the film, the lever 76 rests on a curved piece having a smaller radius. The spring 85 can thus swing the lever so far, that the extension 84 enters the recess 75.

The cam 74 carries an axially directed pin 86. A lever 87 being pivotally mounted on a shaft 73, rests on the pin 86 under the action of a spring. If the extension 84 is lifted off the recess 75 of the cam by the run down of the counting device or by pressing the set-back knob 89, the spring 88 moves the adjusting knob into the neutral position, indicated at O, in which the lever 87 abuts against a stationary stop 89 and thus disconnects the positive connection between the spring 88 and the cam 74.

A connecting rod 90 rests on the periphery of the cam under the action of a spring (not shown), the connecting rod 90 controlling a switch 91 provided on the motor circuit and effecting an adjustment of the speed regulator 37 (not shown in FIG. 10) of the camera motor 36. The cam 74 is so designed that already during the changing over from the position S (silent film recording) to the neutral position O, the contact of the switch 91 is open and the centrifugal regulator 37 is changed over from 16 frames per sec. to 14 frames per sec. The contacts of the switches 92, 93, controlled by the lever 76 are only closed when the extension 84 engages the recess 75. In the position O the camera motor is therefore out of current and a release of the camera is impossible.

FIG. 11 shows a variant of the above described arrangement, in which the adjusting knob and the cam disk are combined to one single integral part 94. The recess 95 is more shallow on its left side. If the knob is pressed to the right side into the camera, the extention 84 slides out of the recess 95. By the spring 88 the adjusting knob 94 is turned into the O-position.

FIG. 12 shows the circuit diagrams of the camera and the control arrangement of the tape recorder. The left hand half shows the circuit diagram of the camera, the right hand half indicates the circuit diagram of the part of the control arrangement, arranged on the tape recorder. The camera motor 36 is energized by the battery 96 and its speed is held constant by a centrifugal switch 37. The camera release is indicated at 97, the impulse transmitter at 99. The impulse transmitter is operated by the camera driving means and transmits one impulse per image. If the camera is out of operation, the impulse transmitter 99 is maintained in a position, in which it interrupts the circuit. The impulse transmitter 99 is connected to the cup-shaped magnet 27 of the step-by step driving means, by means of the multiwire cable 4, which is schematically shown. As it has already been explained above, the step-by step driving means changes the resistor 35 when synchronous deviations take place. The resistor 35 overbridges the centrifugal switch 37 of the camera motor by interposing the cable 4. By the fact that the centrifugal switch 37 remains in the camera circuit also during the synchronous running, but is adjusted to a frame frequency of 14 frames per sec. it is achieved, that the camera motor obtains—independently of the position of the resistor 35—the full voltage of the battery 96 during the starting. The motor 36 such achieves very quickly the speed according to a frame frequency of 14 frames per sec. which speed causes the centrifugal switch 37 to become open. The regulating resistor 35 becomes effective in the last part of the starting only.

A further circuit led via the cable 4 overbridges the switch 91 of the camera. This circuit contains a switch 98 in the sound recorder, the switch 98 being operated by the switch 11 of the motor of the sound recorder and of the amplifier. The switch 98 and the switch 11 are closed at the same time. A switch 199 is provided in series with the switch 98, the switch 199 being operated by the end arresting device and interrupting the circuit when the total length of the tape has run down. The switch 199 may be operated by a feeler resting against the tape or—via a relay—by conducting foils provided on the tape. The two circuits have two switches 58 and 59 provided on the side of the tape recorder, and two switches 92 and 93 provided on the side of the camera. The contacts of these switches are closed by the preselection switches, arranged on the camera and the tape recorder, when adjusting to "sound film recording." A battery 101 and a release magnet 100 are provided in the tape recorder, parallel to the camera release 97. The release magnet 100 establishes—when being energized—the positive connection between the rotating capstan and the tape. If the contacts of the switches 93 and 59 are closed, the release of the camera and the starting of the tape recorder are simultaneously effected. A starting switch 12 is provided on the tape recorder for the normal recording and/or reproduction without the camera. A switch 57, controlled by the preselection switch is arranged in series with the starting switch 12, the switch 57 interrupting the release circuit on the side of the tape recorder, when the preselection switch is changed over to the preparatory position for the sound film recording.

A miniature incandescent lamp 102 is provided in the range of the film gate of the camera, e.g. on the film pressure plate, the lamp 102 illuminating a small margin of the film during the sound film recording. The lamp is switched on by a switch 103 which is operated by the camera release. A capacitor 104, provided in the circuit of the lamp causes a strong illumination at the beginning of a scene, whereas the illumination during the stationary state is determined by a resistor 105 and is essentially slighter.

The new arrangement is characterized by a simple handling and eliminates errors in handling to a far reaching extent. For the sound film recording it is necessary to operate the preselection switches in both device and to clinch the cable 4, as well as to switch on the tape recorder. If one of these conditions is not met, a release is impossible. A disturbance of the synchronism caused by a manual transport of the film and/or tape is impossible, because the spool rooms of both devices are closed and the release of the sound recorder is locked. A manual operation is only possible, when the preselection switch has been set back. It is also essential that the entire arrangement is arrested, when the tape or the effective part of the film has run down. A further advantage is, that an adjustment to sound film recording is only possible when the leader of the film has completely run down, as very often the leader is rendered useless by incident light, when the film is inserted.

The arrangement can also be completed by the use of two or more cameras, being alternately in operation. It is only necessary therefore, to incorporate a selector switch, having a suitable number of switch positions, into the cable 4, and to fix the releases of the individual cameras in their closed position, e.g. by lockable cable releases. The cameras can now be alternately switched on by adjusting the selector switch, whereas the sound recording is effected synchronously to the film recording on a single permanent passing tape. Since the selector switch always only connects the circuit of one camera, containing the switches 92 and 93, to the circuit of the control device of the tape recorder, containing the switches 58, 59, 89 and 199, and thus overbridges the switch 91 of the camera, only the motor of one single camera is switched on.

Numerous variations of the arrangement may be made without leaving the scope of the invention.

For example, the synchronous regulator may be arranged on the camera, whereby it is mechanically driven by the film or the camera motor, whereas electrical impulses supplying the step-by-step motor, are derived from the sound recorder. The synchronous regulator may also be completely spaced from both devices. In this case, impulse transmitters are provided in the camera as well as in the projector, the impulse transmitters supplying two electromagnetic step-by-step systems. It is obvious, that the step-by-step system described in the specification may be replaced by other suitable types.

What I claim is:

1. An arrangement for the synchronous recording of image and sound, comprising a camera including a circuit having a camera motor and a switch, a tape recorder, a synchronous regulating device regulating the frame frequency of said camera according to the run down length of film and tape, respectively, said camera and said tape recorder being simultaneously started as well as arrested, additional switches provided on said camera as well as on said tape recorder, and one of said additional switches being adapted to preselect the synchronous image and sound recording, said one of said additional switches assuming a plurality of positions, one of said positions being that of "sound film recording" and effecting all switching operations enabling the start and stop, respectively, by means of the camera and the synchronous control of said camera motor, said one of said additional switches being arranged on said camera and opening said switch of said camera motor, upon setting said camera on sound film recording, a circuit overbridging said switch of said camera motor including a further switch on said tape recorder, a preselection switch for said tape recorder, and said further switch being closed by said preselection switch of said tape recorder, upon setting the latter on "sound film recording."

2. The arrangement, as set forth in claim 1, wherein said tape recorder includes at least one of a sound recorder motor and an amplifier having a still further switch, and the latter closing said circuit upon switching on said sound recorder motor and said amplifier, respectively.

3. The arrangement, as set forth in claim 1, which includes an arresting device operated by said further switch and controlled by the tape and closed in its operative condition.

4. The arrangement, as set forth in claim 1, wherein said camera motor circuit includes a centrifugal switch overbridged by said synchronous regulator device and short-circuiting the latter upon reaching the predetermined speed, and said preselection switch reducing the predetermined speed of a speed regulator upon setting on "sound film recording."

5. The arrangement, as set forth in claim 1, which includes marking arrangements for film and tape, respectively, operated by said preselection switch, upon changing to "sound film recording" and setting back into rest position, respectively.

6. The arrangement, as set forth in claim 1, which includes release circuits, and means for interrupting all said release circuits excepting that controlled by said camera by said preselecting switch disposed on said tape recorder, upon setting to "sound film recording."

7. The arrangement, as set forth in claim 1, which includes a lid defining and closing a chamber receiving said film and said tape, respectively, said preselection switch of said camera and of said tape recorder, respectively, are interlocked against said lid, said preselection switch is settable to sound film recording upon closing said lid, and said lid remains locked as long as the switch is in the position "sound film recording" and the preselection is set back into its neutral position upon opening said lid, respectively.

8. The arrangement, as set forth in claim 7, which includes a counting device interlocked with said preselection switch of said camera and of said tape recorder, respectively, and automatically resetting into its initial position upon opening of said lid, such that a changing of the preselection switch into the position "sound film recording" brings about locking and said preselection switch is automatically reset into its rest position, respectively, upon adjusting the counting device according to the run of the leader and trailer, respectively, of the film.

9. The arrangement, as set forth in claim 8, which includes spring-biased locking means for said preselection switch in order to keep the latter in the position for "sound film recording," and in dependence upon the position of said lid and said counting device, respectively, and releasing said preselection switch upon opening said lid and upon reaching a predetermined position by said connecting device, respectively, so that said preselection switch returns into its rest position.

10. The arrangement, as set forth in claim 9, wherein said switch in said camera motor circuit interrupts said circuit, upon adjusting said preselection switch to "sound film recording," and remains open upon releasing said locking means and returning said preselection switch into its rest position, and said circuit overbridging said switch contains a supplemental switch in said camera, said supplemental switch being open when said preselection switch is in its rest position and being closed when said preselection switch is in the position "sound film recording."

11. The arrangement, as set forth in claim 1, which includes means for locking said preselection switch against said synchronous regulating device, so that an adjustment of said preselection switch to "sound film recording" is only possible in a predetermined position of said synchronous regulating device.

12. The arrangement, as set forth in claim 11, which includes two coaxial discs, each of said discs has a recess on its periphery, one of said discs is driven by said synchronous regulating device, the other of said discs is connected with said preselection switch, a lever disposed opposite said discs and having an extension received by said recesses of said discs when said recess of said disc driven by said synchronous regulating device coincides with said recess of said other of said discs and when the latter assumes a position corresponding with a preparatory position of said preselection switch, and means for lifting said extension of said lever out of said recesses of said discs and for securing said other of said discs in the position "sound film recording."

13. The arrangement, as set forth in claim 2, which includes means for interrupting all release circuits by said preselection switch already in its preparatory position except said circuit controlled by said camera.

14. The arrangement, as set forth in claim 13, wherein said means for lifting said extension of said lever are operated by said lid of said tape recorder, and which includes an operating handle for said preselection switch and said lid eventually covers said operating handle for said preselection switch.

15. The arrangement, as set forth in claim 14, which includes a key-shaped pin secured to said lid of said tape recorder, and said key-shaped pin cooperating with said lever and lifting said extension of said lever out of said recesses of said discs upon closing said lid.

16. The arrangement, as set forth in claim 15, wherein said key-shaped pin has a stop means cooperating with said disc connected with said preselection switch and securing said last mentioned disc in the "sound film recording" position, upon closing said lid.

17. The arrangement, as set forth in claim 16, wherein said key-shaped pin has a recess, said disc connected with said preselection switch has an extension and engages with said extension said recess of said pin, thereby locking said lid, and means for adjusting said pin relative to said lid, so that upon adjustment of said pin the extension of said disc disengages said pin, whereby said lid can be unlocked and said preselection switch returns to its rest position.

18. The arrangement, as set forth in claim 17, which includes a marking means for said tape, said pin cooperates with said marking means, and the latter marking said tape when said pin is displaced in order to unlock said lid.

19. The arrangement, as set forth in claim 17, which includes a marking means for said tape, said lever carries said marking means, said marking means comprises a stamp disposed opposite said tape, and said marking means marking said tape when the extension of said lever engages said recesses of said discs.

20. The arrangement, as set forth in claim 19, which includes a stop means comprising a spring, and means operable upon closing said lid of said tape recorder for adjustment of said lever over said stop means for the marking of said tape.

21. The arrangement, as set forth in claim 20, wherein said key-shaped pin has a curved portion, said lever has a lug cooperating with said curved portion, the latter is rendered operative upon closing said lid and marks said tape, so that upon lifting said extension of said lever of the recesses of said discs, said preselection switch can be moved into the "sound film recording" position.

22. The arrangement, as set forth in claim 21, which includes spring-biased means for displaceably mounting said lever for movement into operative position, to act on said disc connected to said preselection switch, a set-back spring acting against said spring-biased means when said extension of said lever engages said discs, and said curved portion is disposed opposite said lug of said lever in its operative position, while said curved portion and said lug of said lever remain out of engagement upon closing said lid, said lever being in its rest position.

23. The arrangement, as set forth in claim 12, which includes two coaxial discs, each of said discs has a recess on its periphery, one of said discs is driven by said synchronous regulating device, the other of said discs is connected with said preselection switch, a lever disposed opposite said discs and having an extension received by said recesses of said discs when said recess of said disc driven by said synchronous regulating device coincides with said recess of said other of said discs and when the latter assumes a position corresponding with a preparatory position of said preselection switch, means for lifting said extension of said lever out of said recesses of said discs and for securing said other of said discs in the position "sound film recording,"

said synchronous regulating device includes a roller driven by said perforated tape, driving means controlled by said camera in dependency upon the film speed and including a ratchet wheel, said discs are disposed coaxially to said roller driven by said tape, one of said discs is coupled directly to said ratchet wheel, the other of said discs has cams on its periphery, switching contacts controlled by said cams for the adjustment to "sound film recording,"

an operating handle secured to said other of said discs, and said cams being adjustable by said operating handle.

24. The arrangement, as set forth in claim 23, which includes pressing rollers liftable off said rollers, said disc connected with said preselection switch has locking means, said pressing rollers engage said locking means, when said preselection switch is in its rest position, is released and rests against said roller upon displacing said preselection switch.

25. The arrangement, as set forth in claim 1, which comprises said tape recorder and at least two cameras, and which includes a selector switch having at least two switching positions and disposed in said junction cable between said synchronous regulating device and said cameras, so that said cameras can be connected alternately with said tape recorder, said cameras have releases, means for locking said releases in their operating position, and said releases of said cameras being effected directly by the operation of said selector switch.

26. The arrangement, as set forth in claim 1, wherein said synchronous regulating device comprises a roller driven by said perforated tape, a disk firmly connected to said roller, at least two elastic blades of substantially helicoidal shape carried by said disc, a ferromagnetic disc connected to the free end of said blades for a rotary motion, an electromagnet disposed opposite said ferromagnetic disc, said electromagnet being energized by impulses originating from said camera, said ferromagnetic disc performing a rotary motion opposite to the direction of movement of said tape upon energizing said electromagnet in order to drive said ratchet wheel, the latter is adapted to control a regulator for said camera and to remain stationary when the film and the tape are in synchronism.

27. The arrangement, as set forth in claim 26, wherein said elastic blades are running parallel to the axis of rotation upon energizing said electromagnet.

28. The arrangement, as set forth in claim 27, wherein said elastic blades, said pawl and said disc carrying said elastic blades are made integrally of elastic plastic material.

References Cited by the Examiner

UNITED STATES PATENTS

| | | | |
|---|---|---|---|
| 1,973,400 | 9/1934 | Deybarrondo | 352—22 |
| 2,206,192 | 7/1940 | Johnson | 352—22 |
| 3,160,888 | 12/1964 | Midlash | 352—15 |

NORTON ANSHER, *Primary Examiner.*